United States Patent [19]

Mitchell

[11] 4,265,731
[45] May 5, 1981

[54] SEPARATION AND PROCESSING OF CRUDE OIL

[75] Inventor: Norris W. Mitchell, Sweeny, Tex.

[73] Assignee: Phillips Petroleum Company, Bartlesville, Okla.

[21] Appl. No.: 110,304

[22] Filed: Jan. 8, 1980

[51] Int. Cl.³ .................. B01D 3/10; C10G 51/06; C10G 67/00
[52] U.S. Cl. .................................... 208/80; 196/106; 196/114; 196/132; 208/113; 208/354; 422/189
[58] Field of Search .................. 208/80, 113–124, 208/209, 354, 357; 196/106, 114, 132; 422/187, 188, 189

[56] References Cited

U.S. PATENT DOCUMENTS

| | | | |
|---|---|---|---|
| 3,004,911 | 10/1961 | Slover | 208/78 |
| 3,110,663 | 11/1963 | Miller | 196/106 X |
| 3,155,607 | 11/1964 | Friess | 208/357 X |
| 3,190,828 | 6/1965 | Daniel et al. | 208/80 X |
| 3,257,313 | 6/1966 | Martini | 196/106 X |
| 3,310,487 | 3/1967 | Johnson et al. | 196/106 X |

Primary Examiner—Delbert E. Gantz
Assistant Examiner—G. E. Schmitkons

[57] ABSTRACT

A method and apparatus for separating a residual crude oil into a light oil fraction and a heavy oil fraction in which the oil is first separated into a first light oil fraction and a first heavy oil fraction, the first heavy oil fraction is further separated into a second light oil fraction, an intermediate oil fraction and a second heavy oil fraction and the intermediate fraction is recycled to the first separation step.

50 Claims, 3 Drawing Figures

4,265,731

SEPARATION AND PROCESSING OF CRUDE OIL

BACKGROUND OF THE INVENTION

The present invention relates to the separation and processing of crude oil. More specifically the present invention relates to the separation and processing of crude oil to maximize the production of gasoline.

The first step in processing almost all petroleum or crude oil is to distill the oil to remove the major portion of the more volatile components and leave a residual oil or residuum ofter referred to as a reduced crude, a topped crude and by various other terms depending upon the specific separation technique. The process by which this is accomplished is often referred to as stripping, skimming, topping or the like and normally involves fractionation of the volatile components into the various preliminary classifications of products. Such fractionation is accomplished in a pipe still or fractionating tower which separates fractions or cuts according to their boiling range. In one specific instance the fractionator is operated at atmospheric pressure and steam is used as a stripping medium.

Generally this preliminary classification or separation follows a somewhat similar pattern for all crude oils. Specifically, a gas is taken off as an overhead, which ultimately may be treated, separated and utilized, in part, as feed for the production of chemicals, a light blending stock of gasoline, etc. and a gasoline fraction, usually referred to as straight run or virgin gasoline is separated as a top side cut from the fractionator and, of course, is useful as an automotive fuel, usually after upgrading as by reforming to higher octane product. From this point it is possible to produce any number of side cuts having different boiling ranges depending upon the type of crude and the ultimate products desired. However, in general, the next lighter side cut is usually a kerosene fraction utilizable as a furnace oil, jet fuel or the like, then a middle distillate often referred to as virgin or straight run gas oil which may be used as a source of lube oil and/or waxes or as a cracking stock for the production of gasoline, depending upon the type of crude oil processed. Finally, all crudes produce a bottoms cut, heretofore referred to as a reduced crude or topped crude, which may be processed to produce asphalt, lube oils, wax products, and the like or at least a portion thereof can be cracked to produce additional gasoline.

The present invention is directed to the separation of a crude oil in an atmospheric tower with stripping steam, the production of a straight run gas oil, which is ultimately cracked, and cracking of the residual crude oil. While in some cases the virgin or straight run gas oil and the residual crude oil are cracked in a single cracking operation, it is preferable to separately crack the virgin gas oil and the residual crude oil since the virgin gas oil is more refractory than the residual crude oil and is best cracked under more severe conditions, particularly a higher temperature than the cracking of the residual crude oil.

To the extent that the crude oil contains significant amounts of sulfur, it is the usual practice to desulfurize the residual crude oil before subjecting the same to cracking.

Irrespective of whether desulfurization is practiced it is also common practice to further separate the residual crude oils into a light gas oil fraction is fed to a cracking step along with the virgin gas oil and a heavier reduced crude which is fed to the less severe cracking step. Such separation, preliminary to cracking, has the additional advantage that the light gas oil fed to the more severe cracking step is essentially freed of contaminants, particularly asphaltic materials, and such contaminants are retained in the reduced crude which is subjected to less severe cracking conditions.

The separation of the residual crude oil can be practiced as a two-step operation in which the residual crude oil is passed to a first fractionating step wherein it is separated into a light gas oil and a heavy crude oil and the heavy crude fraction to a second separation step where a clean gas oil is removed and combined with the virgin gas oil and the light gas oil from the first fractionator and fed to the clean oil or high severity cracker. The reduced crude from the second separator, containing the major portion of the contaminants, is then fed to the dirty oil or less severe cracker. In accordance with the present invention, the second separation step is carried out in a vacuum tower wherein vacuum is drawn on the top of the tower, clean vacuum gas oil is removed as an upper side cut and the vacuum reduced crude is withdrawn as a bottoms product. In such a vacuum tower operation a dirty gas oil fraction may be withdrawn from a lower trapout tray above the locus of the feed to the tower and recycled back to the vacuum tower at a point below the point of introduction of the feed.

Where the residual crude oil is desulfurized, particularly where hydrodesulfurization is utilized, the desulfurized residual crude oil can be fed directly to the first fractionating step without intermediate heating since the oil is heated during the desulfurization step.

While the two-step separation of residual crude oil, in which the second separation step involves vacuum distillation, produces larger quantities of cracked gasoline than other techniques it has been discovered, in accordance with the present invention, that problems still exist which prevent the production of maximum quantities of cracked gasoline. For example, contaminants, such as asphaltic materials, are often carried over with the vacuum gas oil and result in contamination of the catalyst in the high severity cracker as well as other operational problems. It has also been found that significant quantities of light gas oil are retained in the vacuum reduced crude and are thus sent to the less severe cracking step. This results in insufficient cracking of the lighter gas oils and thus a substantial reduction in the volume of cracked gasoline ultimately produced. It has also been found that lack of control over the nature of the residual crude oil from the crude oil stripping step also reduces the ultimate volume of gasoline which can be produced. Further, and related to such imprecise control of the residual crude oil fraction, is the lack of control over the amount of stripping steam employed. This of course often results in a waste of stripping steam and ultimately a waste of energy in a crude oil stripping step.

It is therefore an object of the present invention to provide an improved process for the separation and processing of crude oil which overcomes the above-mentioned and other problems.

Another object of the present invention is to provide an improved method and apparatus for separating and processing crude oil.

Yet another object of the present invention is to provide an improved method and apparatus for the separation and processing of crude oil wherein increased volumes of gasoline are produced.

A still further object of the present invention is to provide an improved method and apparatus for separating crude oil wherein the production or virgin gas oil is increased.

A further object of the present invention is to provide a method and apparatus for separating crude oil wherein the volume of residual crude oil is reduced.

Yet another object of the present invention is to provide an improved method and apparatus for the separation of crude oil wherein the energy requirements are reduced.

A further object of the present invention is to provide an improved method and apparatus for the separation of crude oil wherein a thermal property of residual crude oil is controlled.

Another object of the present invention is to provide an improved method and apparatus for separating crude oil wherein the energy requirements for such separation are reduced and a thermal property of the residual crude oil produced is controlled.

A further object of the present invention is to provide an improved method and apparatus for the separating and processing of crude oil wherein the volume of virgin gas oil is increased, the volume of residual crude oil is decreased and the volume of gasoline produced is increased.

A still further object of the present invention is to provide an improved method and apparatus for separating and processing a residual crude oil.

Another and further object of the present invention is to provide an improved method and apparatus for separating and processing a residual crude oil wherein the volume of gasoline produced is increased.

These and other objects and advantages of the present invention will be apparent from the following description.

SUMMARY OF THE INVENTION

A method and apparatus for separating a residual crude oil; including, separating the residual crude oil into a first light oil fraction and a first heavy oil fraction in a first separation, separating the first heavy oil fraction into a second light oil fraction, an intermediate oil fraction and a second heavy oil fraction in a second separation step and recycling the intermediate oil fraction to the first separation. In another aspect, the invention includes a method and apparatus for separating at least one fraction boiling above the gas oil range, separating a virgin gas oil fraction from a residual crude oil and controlling a thermal property, e.g., initial boiling point, of the residual crude oil. The virgin gas oil fraction from the separation of the crude oil and/or the first and second light oil fractions, from the separation of the residual crude oil, are cracked to produce gasoline in a first cracking operation and the second heavy oil fraction, separated from the residual crude oil, is cracked to produce gasoline in a second cracking operation under less severe conditions than the first cracking operation.

DESCRIPTION OF THE PREFERRED EMBODIMENTS

The nature and advantages of the present invention can best be illustrated by a specific example described with reference to the drawings.

Figure 1:
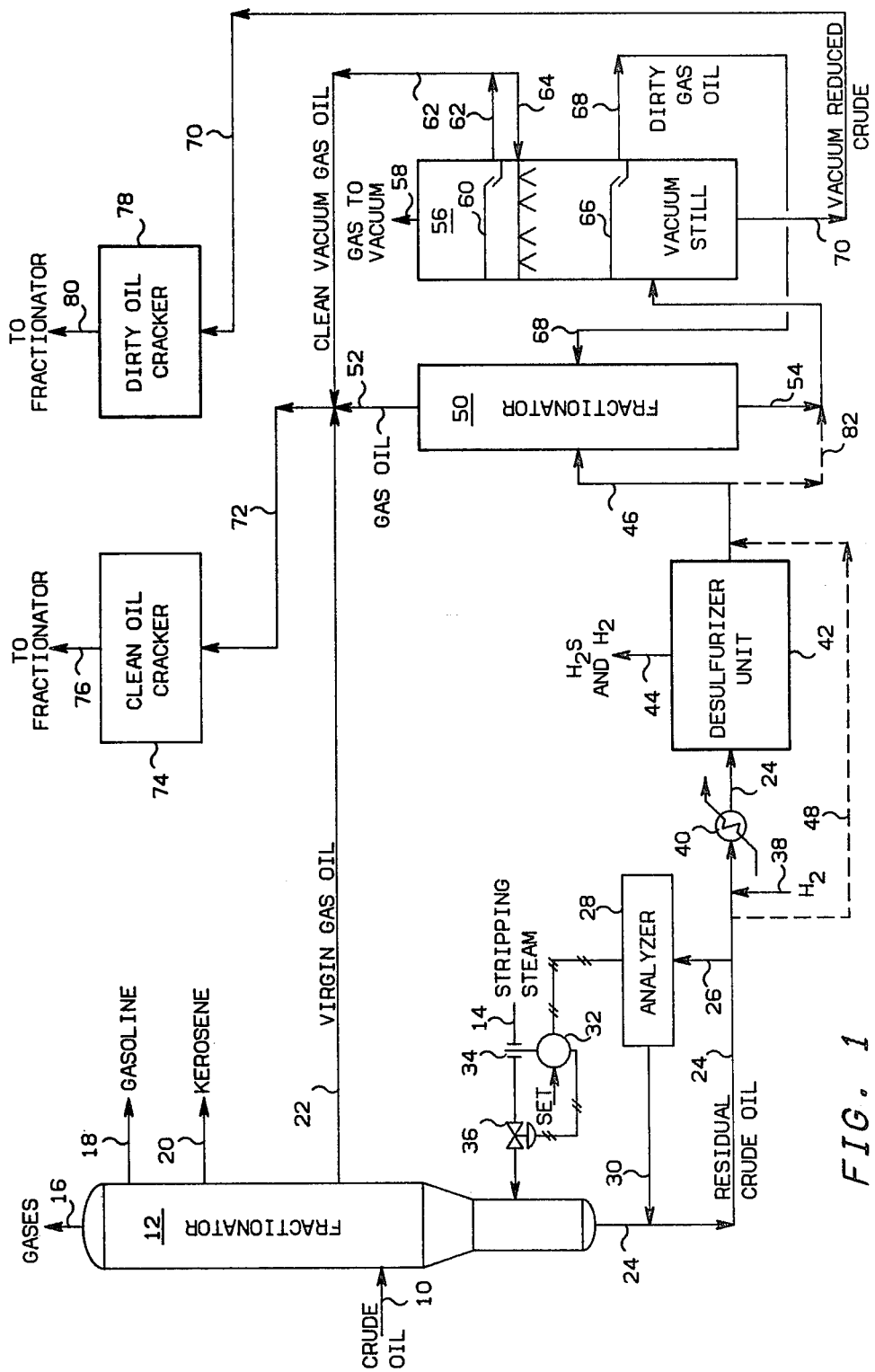
FIG. 1 is a simplified flow diagram of an overall process in accordance with the present application.

FIG. 1 of the drawings shows a preferred embodiment of the present invention. In accordance with FIG. 1, crude oil is fed through line 10 to a fractionator 12, which may be any suitable means for preliminarily separating the crude oil into appropriate products, such as a pipe still, a distillation column, etc. In a preferred embodiment, in accordance with the present invention, fractionator 12 is an atmospheric fractionator supplied with stripping steam through line 14 adjacent the bottom of the fractionator. Fractionator 12 may be operated at a bottom temperature between about 680° F. to about 730° F., and preferably about 705° F. and a pressure between about 10 psig and about 30 psig, and preferably about 20 psig. Steam at about 300° to 320° F. would normally be supplied at a rate between about 4 to 51 pounds per barrel of feed 10. Pressures, temperatures, steam temperatures and rates depends, among other factors, upon the quantity and quality of the feed 10 and the desired separations to be made. Gases and vapors, including water vapor, are withdrawn as an overhead through line 16. This gaseous stream can, of course, be further processed to remove water, remove normally liquid components therefrom, which can be blended with gasoline, and recover the remaining normally gaseous components, which have value as a feed for chemical production or otherwise. Components boiling above the gas oil boiling range are withdrawn as one or more side streams from the upper portion of fractionator 12. In the embodiment illustrated, a gasoline fraction is withdrawn as the uppermost side stream through line 18. This gasoline is normally referred to as raw gasoline, virgin gasoline or straight run gasoline. After chemical treatment and other processing treatments, e.g. reforming, the gasoline may be used as a high octane motor fuel component. This straight run gasoline stream preferably has an initial boiling point between about 150° to 200° F. and an end point of between about 410° to 430° F. The next lower side stream withdrawn through line 20 is a kerosene fraction having a closed cup flash point (TCC) above about 125° F. and an initial boiling point between about 410°–440° F. and an end point between about 520° to 550° F. After appropriate chemical treatment and clarification this fraction may be utilized as a fuel, including a jet fuel. The final side cut from fractionator 12 is a virgin gas oil fraction having an initial boiling point between about 500°–520° F. and an end point between about 930° to 970° F. The virgin gas oil is withdrawn through line 22 and will be treated as hereinafter mentioned. The bottoms fraction from fractionator 12 is a residual crude oil sometimes referred to as residuum, reduced crude oil or. in the case of the embodiment shown, a topped crude oil. This fraction is withdrawn through line 24. The residual crude oil is of course the heaviest fraction of the crude oil and contains substantially all of the contaminants, particularly asphaltic materials, and will have an initial boiling point between about 880° to 920° F.

In conventional operations, stripping steam is introduced through line 14 at a substantially constant rate. However, it has been discovered, in accordance with one aspect of the present invention, that a certain amount of gas oil is retained in the residual crude oil and, for reasons which will be pointed out hereinafter, this reduces the volume of gasoline which can be produced from a given crude oil. Consequently, it has been found that the volume of gas oil separated from the crude oil can be increased or, alternatively, the amount of gas oil carried over with the residual crude oil can be decreased by controlling a thermal property of the residual crude oil. Specifically, a sample of the residual crude oil is withdrawn through line 26, passed through an analyzer 28, wherein it is analyzed for a selected thermal property, such as flash point, vapor pressure, or, preferably, the initial boiling point. After analysis the sample can be returned to line 24 through line 30. A signal representative of the thermal property measured is sent to recorder controller 32. Simultaneously, the temperature, flow rate or volume of stripping steam passing through line 14 is detected by detector 34 and an appropriate signal is fed to recorder controller 32. Also, simultaneously, a predetermined value of the measured thermal property of the residual crude oil is set into recorder controller 32. Recorder controller 32 then sends an appropriate signal to valve 36 in stripping steam line 14 to increase or decrease the flow of stripping steam to fractionator 12. Thus, by adjusting the stripping steam to fractionator 12, the character of residual crude oil through line 24 can be maintained substantially constant with respect to the thermal property selected, particularly the initial boiling point thereof. By this technique, as previously indicated, a maximum volume of gas oil can be separated through line 22 and the volume of gas oil carried over with residual crude oil through line 24 is reduced. Incidental advantages include, reduction in the energy requirements of the system, to the extent that only sufficient stripping steam is utilized to attain the maximum recovery of virgin gas oil, and the volume of residual crude oil, which is processed as hereinafter described is reduced, thereby reducing the load in the subsequent processing units.

If the crude oil contains sulfur compounds, such sulfur compounds will normally be concentrated in the residual crude oil except for gaseous materials such as hydrogen sulfide and light mercaptans which will be carried over in the gases through overhead line 16 and in part in the gasoline and kerosene cuts. Consequently, the residual crude oil will normally be desulfurized. The desulfurization may be carried out in any number of ways, depending upon the character of the sulfur compounds and the relative concentration thereof. However, in the embodiment being described the desulfurization is accomplished by catalytic hydrodesulfurization. In this particular instance, hydrogen is added to the residual crude oil through line 38 and the composite stream is heated in heater 40. The heated residual crude oil, containing the appropriate amount of hydrogen, is then fed to desulfurization unit 42. Since the hydrodesulfurization technique is well known in the art, no further details thereof will be included and it will be assumed that hydrodesulfurization unit 42 includes appropriate separating means for separating the resultant hydrogen sulfide and excess hydrogen, which are discharged through line 44. The desulfurized residual crude oil is discharged from desulfurization unit 42 through line 46. To the extent that the crude oil employed does not contain significant amounts of sulfur compounds or the crude has been desulfurized prior to fractionation in fractionator 12, the residual crude oil can be passed from line 24 through alternate line 48. In this case it will be necessary to heat the residual crude oil for subsequent separation as described. However, where the hydrodesulfurization unit is utilized, or another desulfurization technique is utilized in which the residual crude oil is heated during desulfurization, it is not necessary to additionally heat the residual crude oil discharged from the desulfurization unit.

In accordance with another aspect of the present invention, the residual crude oil through line 46 is subjected to two separation stages. Specifically, the residual crude oil from line 46 is charged to a preliminary fractionator 50 from which a light gas oil fraction is withdrawn through line 52 and a heavy residual fraction is withdrawn through line 54. The heavy residual fraction is then fed to a second separation step, which in this case is a vacuum tower or still 56. A vacuum is drawn on unit 56 through line 58 which also removes an overhead gas fraction. A clean vacuum gas oil is discharged from an upper trapout tray 60 through line 62. In accordance with another aspect of the present invention, a portion of vacuum gas oil discharged through line 62 is recycled to unit 56 through line 64. Preferably this recycle stream is sprayed into unit 56 as a reflux just below trapout tray 60. This recycle spray serves to remove heavy residual materials from the vacuum gas oil, particularly contaminants such as asphaltic materials, thereby further cleansing the vacuum gas oil, which is removed through line 62. An intermediate gas oil fraction, which is herein referred to as a dirty gas oil, which contains increased amounts of contaminants, particularly asphaltic materials, is withdrawn as a side cut fraction from a lower trapout tray 66 and is discharged through line 68. The dirty gas oil in line 68 is then recycled to fractionator 50, at a point substantially on the same level as the feed through line 46, or is combined with the residual crude oil feed through line 46. This technique of recycling the dirty gas oil through line 68 to the first separation step, conducted in fractionator 50, makes it possible to significantly increase the volume of clean vacuum gas oil and reduce the amount of gas oil in the vacuum reduced crude, separated as a bottoms fraction through line 70.

The virgin gas oil passing through line 20, the gas oil separated in fractionator 50 and passing through line 52 and the clean vacuum gas oil separated in a vacuum still 56 and passing through line 62 are all combined through line 72 and fed to an appropriate clean oil cracking unit 74. Since the gas oil streams are highly refractory, cracking unit 74 is operated under severe cracking conditions such as catalyst to oil weight ratio of 3:1 to 12:1 (5:1), residence time of 0.5 to 3 seconds (1 sec.), temperature, and particularly at a high such as 880° F. to 1030° F. (990° F.). Cracking unit 74 is preferably a fluid catalytic cracking unit. Cracked products from cracking unit 74 are discharged to fractionation through line 76. Vacuum reduced crude passing through line 70 from vacuum still 56 is fed to dirty oil cracker 76. Dirty oil cracker 76 is operated at less severe conditions than cracker 74, such as catalyst to oil weight ratio of 2:1 to 10:1 (4:1), residence time 1 to 5 seconds (3 sec.), and particularly at temperatures such as 850° F. to 1000° F. (950° F.) Cracker 78 is also preferably a fluid catalytic cracking unit. Cracked products are discharged from cracker 78 through line 80 to appropriate fractionating equipment. Where a two-stage separation of residual crude is not practiced, the residual crude from desulfurization unit 42 may be passed directly to vacuum still 56 through alternate flow line 82.

By maintaining the character of the residual crude oil from fractionator 12 substantially constant, recycling dirty gas oil from vacuum still 56 to fractionator 50 and/or recycling a portion of vacuum gas oil to vacuum still 56, significantly increased volumes of clean gas oil can be fed to cracking unit 74 and decreased amounts of gas oil will be fed to cracking unit 78 with the vacuum reduced crude, thereby substantially increasing the volume of gasoline produced by cracking units 74 and 78.

Figure 2:
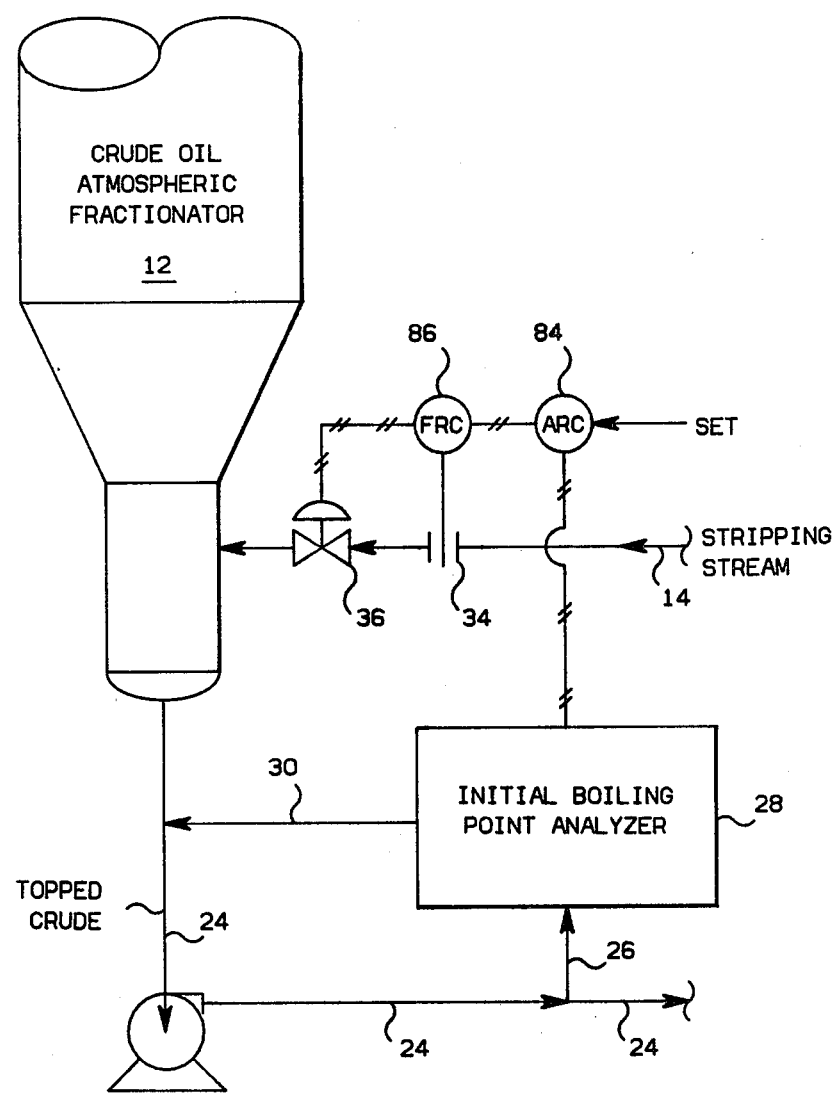
FIG. 2 is a flow diagram, partially in section, of the control system for the crude oil fractionator of FIG. 1.

FIG. 2 of the drawings illustrates, in somewhat greater detail, the control system for maintaining a constant character residual crude oil from fractionator 12. Specifically, fractionator 12, in this case, is a crude oil atmospheric fractionator and the residual crude oil through line 24 is a topped crude. The analyzer 28 is preferably an initial boiling point analyzer which sends a signal to an analyzer recorder controller 84. Analyzer recorder controller can be a temperature recorder controller also. Analyzer recorder controller 84 sends a signal to flow recorder controller 86. Flow recorder controller 86 is supplied with an appropriate signal from detector 34, which in this case, detects the flow rate or volume of stripping steam passing through line 14. Flow recorder controller 86 passes an appropriate signal to control valve 36, thereby controlling the flow rate of stripping steam in accordance with a predetermined initial boiling point for topped crude passing through line 24.

Figure 3:
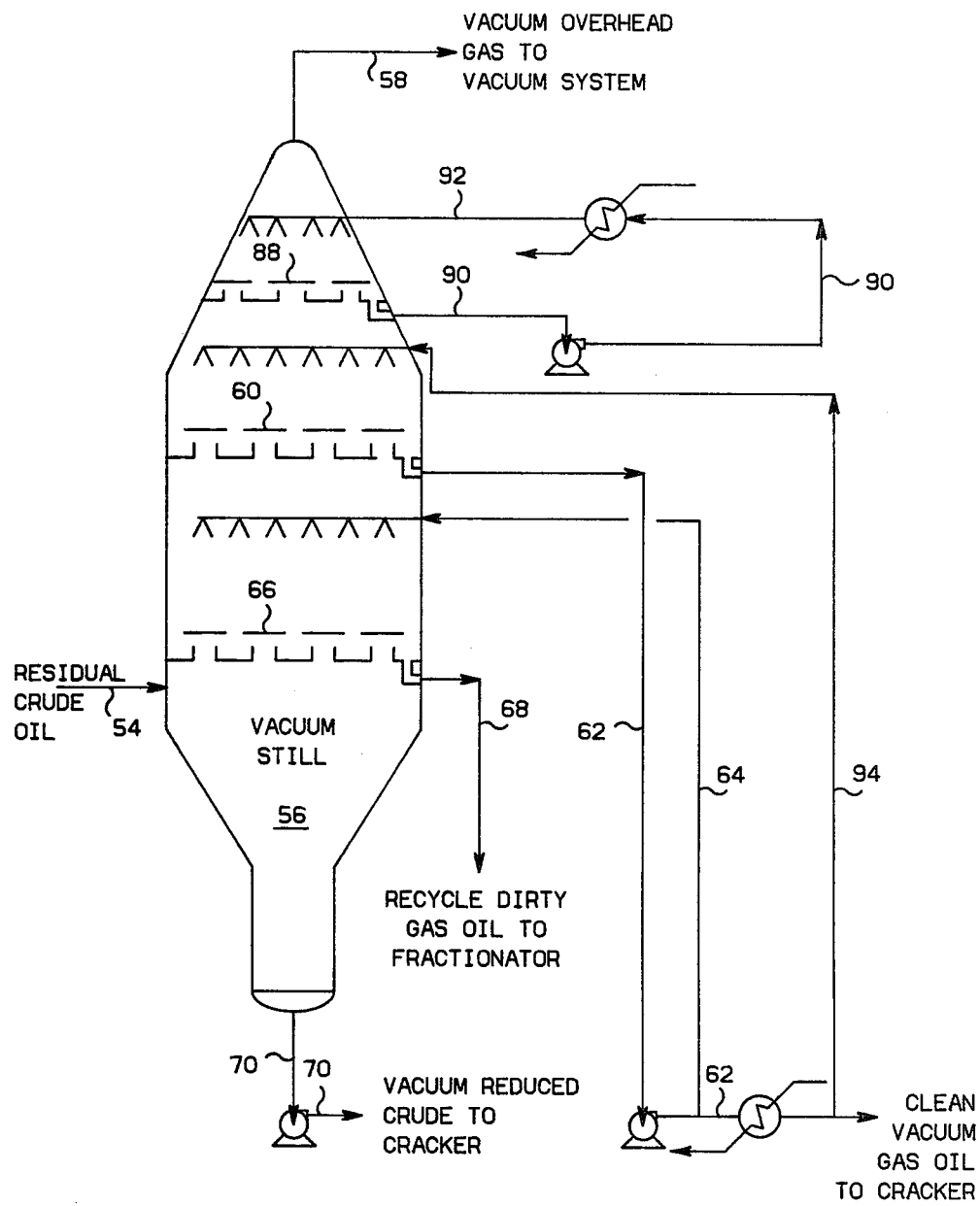
FIG. 3 is a flow diagram illustrating in somewhat greater detail the vacuum distillation system of FIG. 1.

FIG. 3 of the drawings is an enlarged representation of vacuum still 56. As shown at FIG. 3, a side cut may be withdrawn adjacent the top of still 56 from trapout tray 88, passed through line 90, cooled and recycled to the still above trapout tray 88 through line 92. This recycle stream is preferably introduced as a spray and serves as a reflux for the tower. The clean vacuum gas oil passing through line 62 to the cracker can be cooled and, if desired, a portion of the cooled vacuum gas oil may be passed through line 94 and sprayed into the tower as a reflux above trapout tray 60.

The following table sets forth ranges of operating conditions which can be utilized in carrying out the present invention and a typical specific operation and the results thereof. The parenthetic numbers refer to the items of equipment or flow lines of FIG. 1 of the drawings:

| | | Range | Specific |
|---|---|---|---|
| (50) | Desulfurized Residual Crude Oil Fractionator | | |
| | Bottom Temperature, °F., | 671 to 715 | 700 |
| | Pressure, psig., | 13 to 25 | 18 |
| (56) | Vacuum Tower: | | |
| | Bottom Temperature, °F., | 553 to 675 | 614 |
| | Top Temperature, °F. | 283 to 347 | 315 |
| | Pressure, mm Hg absolute, | 20 to 30 | 25 |
| (68) | Side Cut: | | |
| | Initial Boiling Point, °F., | 550 to 650 | 600 |
| | End Point, °F., | 900 to 1000 | 950 |
| (42) | HDS Operation: | | |
| | Temperature, °F., | 675 to 775 | 725 |
| | Pressure, psig., | 2000 to 2600 | 2400 |
| | SCH $H_2$/Bb Feed, | 200 to 2000 | 800 |
| | Residence time, seconds, | 250 to 600 | 350 |

By operating in accordance with the present invention, i.e., charging the vacuum tower side cut (68) to the fractionator (50), as opposed to a conventional operation, i.e., returning the vacuum tower side cut (68) to the lower section of the vacuum tower (56), four additional barrels of catalytically cracked gasoline can be produced per 100 barrels of residual crude oil charged to the desulfurizer unit (42). Other benefits have been previously mentioned.

While specific conditions, modes of operation and items of equipment have been referred to herein for illustrative purposes, it is to be understood that such specifics are not to be considered limiting except as claimed.

What is claimed is:

1. A method for separating a residual crude oil into a light oil fraction and a heavy oil fraction, comprising:
    (a) separating said residual crude oil into a first light oil fraction and a first heavy oil fraction in a first separation step;
    (b) separating said first heavy oil fraction into a second light oil fraction, an intermediate oil fraction and a second heavy oil fraction in a second separation step; and
    (c) recycling said intermediate oil fraction to said first separation step (a).

2. A method in accordance with claim 1 wherein a vacuum is maintained during the second separation step.

3. A method in accordance with claim 1 wherein a portion of the separated second light oil fraction is recycled to the second separation step at a point below the point of separation of said second light oil fraction and above the point of separation of the intermediate oil fraction.

4. A method in accordance with claim 3 wherein the recycled portion of the second light oil fraction is returned to the second separation step at a point sufficiently close to the point of separation of said second light oil fraction to remove entrained heavy oil from substantially all of the vapors rising above the point of separation of the intermediate oil fraction and the point of separation of the second heavy oil fraction.

5. A method in accordance with claim 1 wherein the second heavy oil fraction is cracked.

6. A method in accordance with claim 5 wherein the cracking step is carried out in the presence of a fluidized catalyst.

7. A method in accordance with claim 1 wherein the first and second light oil fractions are combined and said combined stream is cracked.

8. A method in accordance with claim 7 wherein the cracking step is carried out in the presence of a fluidized catalyst.

9. A method in accordance with claim 1 wherein the first and second light oil fractions are combined and said combined stream is cracked in a first cracking step and the second heavy oil fraction is cracked in a second cracking step at less severe conditions than said first cracking step.

10. A method in accordance with claim 9 wherein the second cracking step is carried out at a lower temperature than the first cracking step.

11. A method in accordance with claim 9 wherein the first and second cracking steps are carried out in the presence of a fluidized catalyst.

12. A method in accordance with claims 7, 8, 9, 10 or 11 wherein a virgin gas oil fraction is separated from a crude oil containing at least one light crude oil fraction boiling below the boiling range of the residual crude oil to produce said residual crude oil and said virgin gas oil fraction is combined with the first and second light oil fractions and cracked in the light oil cracking step.

13. A method in accordance with claim 1 wherein sulfur is removed from the residual crude oil in a desulfurization step prior to the first separation step.

14. A method in accordance with claim 13 wherein sulfur is removed by contacting said residual crude oil with hydrogen and removing hydrogen sulfide and excess hydrogen from therefrom.

15. A method in accordance with claim 14 wherein the desulfurization step is carried out in the presence of a catalyst.

16. A method in accordance with claim 1 the residual crude oil is a crude oil fraction boiling below the virgin gas oil range.

17. A method in accordance with claim 16 wherein the residual crude oil is topped crude oil.

18. A method in accordance with claim 1 wherein the residual crude oil is a reduced crude oil.

19. A method in accordance with claim 1 wherein a crude oil containing at least one light crude oil fraction boiling below the boiling range of the residual crude oil is steam stripped in a steam stripping step to remove said light crude oil fraction and produce said residual crude oil.

20. A method in accordance with claim 19 wherein the severity of the steam stripping step is adjusted in accordance with a thermal property of the residual crude oil.

21. A method in accordance with claim 20 wherein the severity of the steam stripping step is adjusted by adjusting the volume of the steam to said steam stripping step.

22. A method in accordance with claim 20 wherein the severity of the steam stripping step is adjusted by adjusting the temperature of the steam to the steam stripping step.

23. A method in accordance with claim 19 wherein the light crude oil fraction contains a virgin gas oil fraction, said virgin gas oil fraction is separated from the crude oil during the steam stripping step and said virgin gas oil fraction is combined with at least one of (1) the first light oil fraction or (2) the second light oil fraction and the combined stream is cracked in a cracking step.

24. A method in accordance with claim 23 wherein the cracking step is carried out in the presence of a fluidized catalyst.

25. A method in accordance with claim 23 or 24 wherein the virgin gas oil fraction is combined with both the first and the second light oil fractions.

26. Apparatus for separating a residual crude oil into a light oil fraction and a heavy oil fraction, comprising:
   (a) first separator means for separating said residual crude oil into a first light oil fraction and a first heavy oil fraction;
   (b) second separator means operatively connected to said first separator means for receiving said first heavy oil fraction and further separating said first heavy oil fraction into a second light oil fraction, an intermediate oil fraction and a second heavy oil fraction; and
   (c) recycle means for receiving said intermediate oil fraction from said second separating means and introducing said intermediate oil fraction into said first separator means.

27. Apparatus in accordance with claim 26 wherein the first separator means is a fractionation column.

28. Apparatus in accordance with claim 26 wherein the second separator means is a vacuum tower.

29. Apparatus in accordance with claim 28 wherein the vacuum tower includes an upper trap out tray disposed in the upper portion of said vacuum tower for collecting the second light oil fraction for removal from said vacuum tower and a lower trap out tray disposed in the lower portion of said vacuum tower for collecting the intermediate oil fraction for removal from said vacuum tower.

30. Apparatus in accordance with claim 29 which includes a second recycle means for receiving a portion of the second light oil fraction after removal from the vacuum tower and recycling said portion of said second light oil fraction to said vacuum tower at a point below said upper trap out tray.

31. Apparatus in accordance with claim 30 wherein the second recycle means includes spray means for spraying the portion of the second light oil fraction into the vapors rising in the vacuum tower.

32. Apparatus in accordance with claim 26 which includes cracking means operatively connected to the second separator means for receiving the second heavy oil fraction and cracking the same.

33. Apparatus in accordance with claim 32 wherein the cracking means is a fluid catalytic cracker.

34. Apparatus in accordance with claim 26 which includes cracking means operatively connected to the first and the second separator means for receiving the first and the second light oil fractions, respectively, and cracking the same.

35. Apparatus in accordance with claim 34 wherein the cracking means is a fluid catalytic cracker.

36. Apparatus in accordance with claim 26 which includes a first cracking means operatively connected to the first separator means and the second separator means to receive the first light oil fraction and the second light oil fraction, respectively, and cracking the same and a second cracking means operatively connected to said second separator means for receiving the second heavy oil fraction and cracking the same.

37. Apparatus in accordance with claim 36 wherein the first and the second cracking means are fluid catalytic crackers.

38. Apparatus in accordance with claim 34, 35, 36 or 37 which includes a third separator means for receiving a crude oil containing at least one light crude oil fraction boiling below the boiling range of the residual crude oil and separating a virgin gas oil fraction from said crude oil and means for combining said separated virgin gas oil fraction with the first and second light oil fractions and introducing the combined stream into the cracking means.

39. Apparatus in accordance with claim 26 which includes desulfurization means for receiving residual crude oil containing sulfur, removing sulfur therefrom and introducing the desulfurized residual crude oil into the first separator means.

40. Apparatus in accordance with claim 39 wherein the desulfurization means is a hydrodesulfurization means and includes means for separating hydrogen sulfide and excess hydrogen from the desulfurized residual crude oil.

41. Apparatus in accordance with claim 40 wherein the hydrodesulfurization means is a catalytic hydrodesulfurization means.

42. Apparatus in accordance with claim 26 which includes a third separator means, including means for introducing steam adjacent the bottom thereof, for receiving a crude oil containing at least one light crude oil fraction boiling below the boiling range of the residual crude oil and separating said light crude oil fraction from said residual crude oil.

43. Apparatus in accordance with claim 42 wherein the means for introducing stripping steam includes control means for controlling the severity of the steam stripping.

44. Apparatus in accordance with claim 43 wherein the control means is a flow control means for adjusting the volume of steam introduced into said third separator means.

45. Apparatus in accordance with claim 43 wherein the control means is a temperature controller for adjusting the temperature of the steam introduced into the third separator means.

46. Apparatus in accordance with claim 42 which includes analyzer means for analyzing the residual crude oil from the third separator, operatively connected to the means for introducing stripping steam into said third separator, and controlling said stripping steam to adjust the severity of steam stripping.

47. Apparatus in accordance with claim 43 or 44 which includes an initial boiling point analyzer for determining the initial boiling point of the residual crude oil separated by the third separator means, operatively connected to the control means, and adapted to adjust the control means in accordance with a predetermined initial boiling point.

48. Apparatus in accordance with claim 42 which includes means for removing a virgin gas oil fraction from the crude oil in the third separator, means for combining said virgin gas oil with at least one of (1) the first light oil fraction or (2) the second light oil fraction and cracking means for cracking the combined stream.

49. Apparatus in accordance with claim 48 wherein the cracking means is a fluidized catalytic cracker.

50. Apparatus in accordance with claim 23 or 24 wherein the means for removing the virgin gas oil fraction includes means for combining said virgin gas oil fraction with both the first and the second light oil fractions.

* * * * *